US012122149B2

(12) United States Patent
Narishima

(10) Patent No.: US 12,122,149 B2
(45) Date of Patent: Oct. 22, 2024

(54) MEDIUM HOLDING DEVICE

(71) Applicant: MIMAKI ENGINEERING CO., LTD., Nagano (JP)

(72) Inventor: Yuichi Narishima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 136 days.

(21) Appl. No.: 17/790,739

(22) PCT Filed: Dec. 28, 2020

(86) PCT No.: PCT/JP2020/049137
§ 371 (c)(1),
(2) Date: Jul. 4, 2022

(87) PCT Pub. No.: WO2021/140990
PCT Pub. Date: Jul. 15, 2021

(65) Prior Publication Data

US 2023/0046349 A1 Feb. 16, 2023

(30) Foreign Application Priority Data

Jan. 7, 2020 (JP) ................................ 2020-001095

(51) Int. Cl.
*B41J 11/00* (2006.01)
*B41J 2/01* (2006.01)
*B41J 11/02* (2006.01)

(52) U.S. Cl.
CPC ............ *B41J 11/0085* (2013.01); *B41J 2/01* (2013.01); *B41J 11/02* (2013.01)

(58) Field of Classification Search
CPC ............................... B41J 11/0085; B41J 11/02
See application file for complete search history.

(56) References Cited

U.S. PATENT DOCUMENTS

2007/0146457 A1 6/2007 Kito
2012/0013669 A1* 1/2012 Toya ....................... B41J 15/04 347/16
2012/0062672 A1* 3/2012 Toya ................... B41J 11/0085 347/104

FOREIGN PATENT DOCUMENTS

JP 2007175948 7/2007
JP 2012056241 3/2012
(Continued)

OTHER PUBLICATIONS

"International Search Report (Form PCT/ISA/210) of PCT/JP2020/049137", mailed on Feb. 22, 2021, with English translation thereof, pp. 1-4.

(Continued)

*Primary Examiner* — Jason S Uhlenhake
(74) *Attorney, Agent, or Firm* — JCIPRNET

(57) ABSTRACT

The disclosure optimizes suction force. An inkjet printing apparatus (1) includes a suction table (2) having a placement surface (21*a*) for the medium (M); a blower (52) that generates a suction force on the placement surface (21*a*); and a control device (55) that controls a suction force generated by the blower (52). The control device (55) includes a switcher (553) that switches the suction force to generate, where when the medium (M) is placed on the placement surface (21*a*), the switcher (553) drives the blower (52) at a first output level to generate a first suction force, and suctions the medium (M) placed on the placement surface (21*a*). Thereafter, the blower (52) is driven at the second output level lower than the first output level to generate the second suction force weaker than the first suction force, thereby suctioning the medium M placed on the placement surface (21*a*).

16 Claims, 6 Drawing Sheets

(56) References Cited

FOREIGN PATENT DOCUMENTS

| | | |
|---|---|---|
| JP | 2012056243 | 3/2012 |
| JP | 2016221725 | 12/2016 |
| JP | 2017047589 | 3/2017 |

OTHER PUBLICATIONS

"Search Report of Europe Counterpart Application", issued on May 16, 2023, p. 1-p. 9.

* cited by examiner (a)

(b)

MEDIUM HOLDING DEVICE

CROSS-REFERENCE TO RELATED APPLICATION

This application is a 371 application of the International PCT application serial no. PCT/JP2020/049137, filed on Dec. 28, 2020, which claims the priority benefits of Japan Patent Application No. 2020-001095, filed on Jan. 7, 2020. The entirety of each of the above-mentioned patent applications is hereby incorporated by reference herein and made a part of this specification.

TECHNICAL FIELD

The present invention relates to a medium holding device.

BACKGROUND ART

In the inkjet printer disclosed in Patent Literature 1, an adsorption unit using a fan is provided on a suction table (printing table) on which a medium is placed.

CITATION LIST

Patent Literature

Patent Literature 1: Japanese Unexamined Patent Publication No. 2007-175948

In the inkjet printer of Patent Literature 1, the medium is fixed to the upper surface of the suction table by the adsorption force (suction force) generated by the adsorption unit (suction force generator) at the time of printing on the medium.

In the inkjet printer of Patent Literature 1, the suction force generated by the suction force generator is changed according to the thickness of the medium to print. The suction force is changed by changing the rotation speed of the fan.

SUMMARY OF INVENTION

Technical Problems

In Patent Literature 1, the suction force is generated by rotating a fan at a constant speed determined according to a required suction force.

The suction force generated by the suction force generator is affected not only by the thickness of the medium but also by the area, temperature, humidity, and the like of the medium.

Therefore, it cannot be said that the suction force is being appropriately generated only by rotating the fan at a constant speed.

Therefore, it is required to optimize the suction force.

Solutions to Problems

According to the present invention, a first invention relates to a medium holding device including:

a table having a placement surface for a medium;

a suction force generator that generates a suction force through a through hole formed in the placement surface; and a controller that controls the suction force generated by the suction force generator; where the controller is configured to include, a switcher that generates, when the medium is placed on the placement surface, a first suction force on the placement surface by the suction force generator to suction the medium, and thereafter, switches the suction force to a second suction force weaker than the first suction force to suction the medium.

According to the present invention, the suction force can be optimized while maintaining the suction force with which the medium can be held on the table.

According to the present invention, in the second invention, the switcher, switches from the first suction force to the second suction force according to, a suction time of the medium with the first suction force, an actual suction force realized by suction of the medium with the first suction force, or processing mode of a processor that processes the medium placed on the placement surface.

According to the present invention, the suction force can be adjusted at an appropriate timing while maintaining the suction force with which the medium can be held on the table.

According to the present invention, in the third invention, the controller includes, a suction force detector that detects an actual suction force realized by suction of the medium with the first suction force; and the switcher switches from the first suction force to the second suction force when a change amount of the actual suction force detected by the suction force detector converges and the actual suction force stabilizes.

According to the present invention, the suction force can be adjusted at an appropriate timing while maintaining the suction force with which the medium can be held on the table.

According to the present invention, in the fourth invention, the controller includes a counter, and the switcher switches the suction force to the second suction force when an elapsed time from a start of suction of the medium with the first suction force reaches a specified time defined in advance by the counter, and the specified time is a time from the start of suction of the medium with the first suction force until the change amount of the actual suction force realized by the suction of the medium with the first suction force converges.

According to the present invention, the suction force can be adjusted at an appropriate timing while maintaining the suction force with which the medium can be held on the table.

According to the present invention, in a fifth invention, the controller when the switch from the first suction force to the second suction force is performed, weakens the suction force in a step-wise manner, and confirms the actual suction force every time the suction force is weakened, and when confirmed that the confirmed actual suction force is within a first threshold value range having a target suction force as a reference, further weakens the suction force.

According to the present invention, the suction force is weakened in a step-wise manner while maintaining the suction force with which the medium can be held on the table. Thus, occurrence of a situation where the suction force becomes too weak while the suction force is being weakened and the medium cannot be appropriately held on the table can be suitably prevented.

According to the present invention, in a sixth invention, the controller is configured not to weaken the suction force even if the confirmed actual suction force is confirmed to be within the first threshold value range when the confirmed actual suction force has reached a lower limit suction force.

According to the present invention, when the suction force is weaker than the lower limit suction force, it may become difficult to hold the medium on the table. Therefore, when weakening the suction force in a step-wise manner, the suction force is weakened with the lower limit suction force as the limit, so that the occurrence of a situation where the suction force becomes weaker than the lower limit suction force and the medium cannot be appropriately held on the suction table can be suitably prevented.

According to the present invention, in a seventh invention, the controller is configured to strengthen the suction force when the confirmed actual suction force is confirmed to be outside a second threshold value range in which the first threshold value range is enlarged toward a side the suction force becomes weaker.

According to the present invention, when the suction force generated on the suction table is weakened, the weakened suction force can be quickly returned to the original suction force.

According to the present invention, in an eighth invention, the controller is configured to, after weakening the suction force, maintain the suction force without changing while the confirmed actual suction force is within the second threshold value range and outside the first threshold value range.

According to the present invention, the medium can be appropriately held by maintaining the suction force without changing while the support of the medium is not impaired even if the suction force is weakened.

Effect of the Invention

According to the present invention, the suction force can be optimized.

DESCRIPTION OF EMBODIMENTS

Hereinafter, an embodiment according to the present invention will be described by taking a case in which an inkjet printing apparatus 1 is applied to a suction table 2 as an example.

Figure 1:
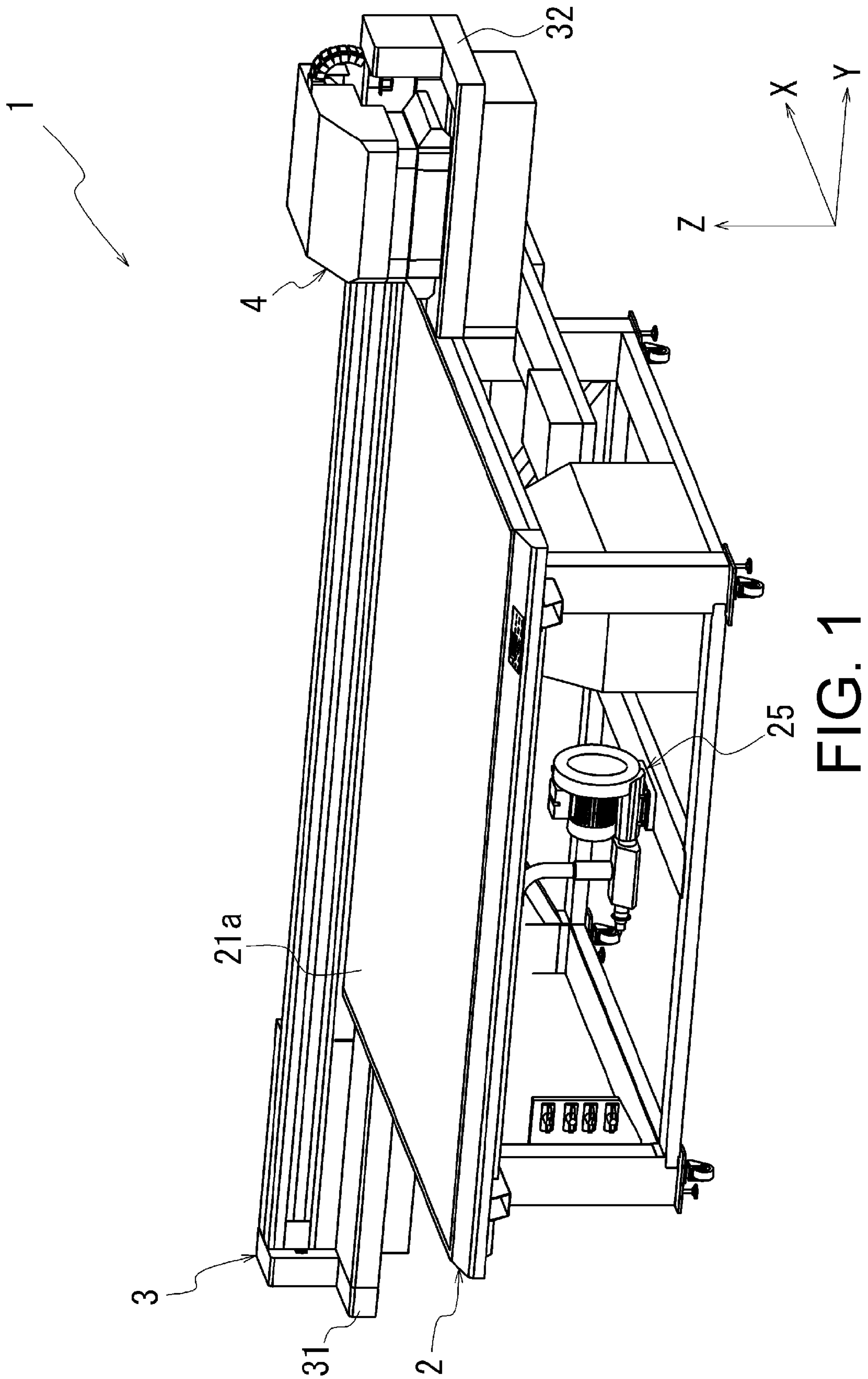
FIG. 1 is a perspective view of an inkjet printing apparatus.

FIG. 1 is a perspective view of an inkjet printing apparatus 1.

Figure 2:
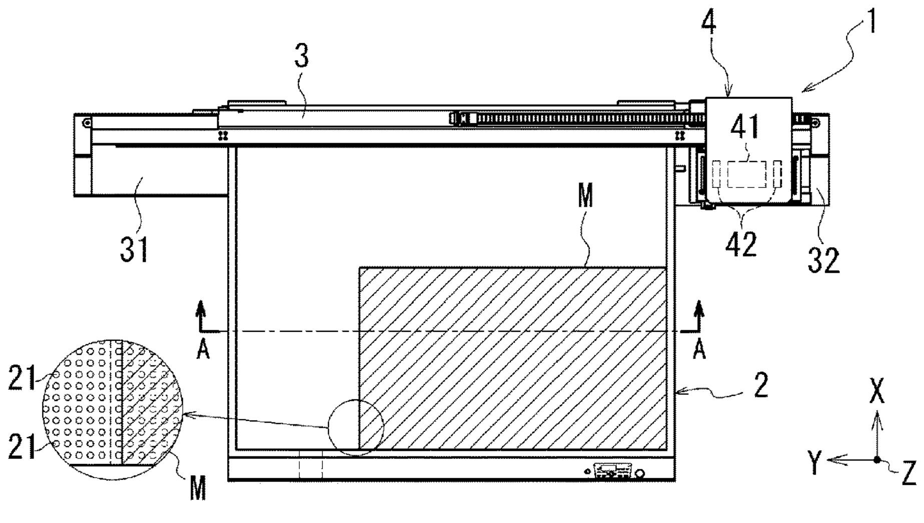
FIG. 2 is a plan view of the inkjet printing apparatus.

FIG. 2 is a plan view of the inkjet printing apparatus 1 as viewed from above.

Figure 3:
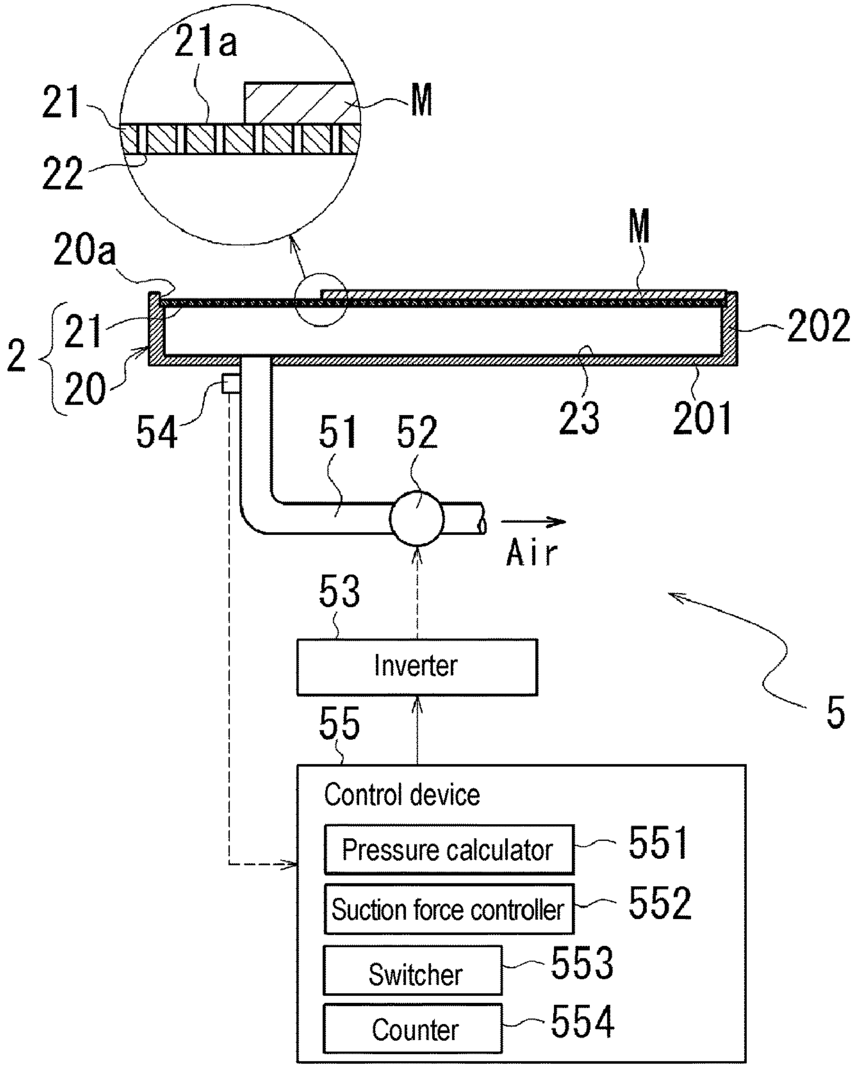
FIG. 3 is a diagram schematically illustrating a connection relationship between a suction table and a suction force generating mechanism.

FIG. 3 is a diagram schematically illustrating a connection relationship between a suction table 2 and a suction force generating mechanism 5.

In FIG. 3, a portion involved in generation of suction force in the suction table 2 is schematically illustrated in a cross section, which cross section corresponds to a cross section taken along line A-A in FIG. 2.

In the following description, the arrangement of each constituent element of the inkjet printing apparatus 1 will be described with the X direction, the Y direction, and the Z direction as the reference, as necessary.

Here, a vertical direction based on an installation state of the inkjet printing apparatus 1 is the Z direction. A main scanning direction of a carriage 4 (inkjet head 41) is the Y direction. A sub scanning direction of the carriage 4 (inkjet head 41) is the X direction.

As shown in FIG. 1, the inkjet printing apparatus 1 has a suction table 2 (table) on which a medium M, which is a printing target object, is placed.

A guide rail 3 (Y bar) disposed in an orientation along the Y direction is provided above the suction table 2.

One end and the other end in the longitudinal direction of the guide rail 3 are supported by support members 31 and 32 disposed on both sides in the width direction (Y direction) of the suction table 2.

The support members 31 and 32 are provided to be movable in the longitudinal direction (X direction) of the suction table 2 by a drive mechanism (not illustrated).

In the inkjet printing apparatus 1, when the support members 31 and 32 are moved in the longitudinal direction (X direction) of the suction table 2, the guide rail 3 supported by the support members 31 and 32 is also moved in the longitudinal direction (X direction) of the suction table 2.

The guide rail 3 is provided in an orientation crossing the suction table 2 in the width direction (Y direction) and is provided horizontally above the suction table 2.

The guide rail 3 supports the carriage 4 that holds the inkjet head 41 (see hidden lines in FIG. 2). The carriage 4 is provided to be movable forward and backward in the longitudinal direction (Y direction) of the guide rail 3.

As shown in FIG. 2, in the inkjet printing apparatus 1, when performing printing on the medium M on the suction table 2, the support members 31, 32 are moved in the sub scanning direction (X direction) by a drive mechanism (not shown), and the carriage 4 is moved in the main scanning direction (Y direction) by a drive mechanism (not shown).

At this time, ink droplets are ejected from the inkjet head 41 located above the medium M toward the upper surface of the medium M, and information such as characters and images is printed on the medium M. The ink droplets ejected onto the medium M are solidified by the ultraviolet light irradiated from a UV irradiation device 42 on both sides of the inkjet head 41, and are fixed on the medium M. The UV irradiation devices 42 are located on both sides of the inkjet head 41 in the Y direction.

As shown in FIG. 3, the suction table 2 of the inkjet printing apparatus 1 includes a table base 20 having an opening **20*a* on the upper surface, and a table top 21 internally fitted into the opening 20*a* of the table base 20**.

The table base 20 includes a bottom wall portion 201 and a peripheral wall portion 202 surrounding the outer periphery of the bottom wall portion 201. The table base 20 has a rectangular shape in plan view as viewed from the upper side in the vertical direction (Z direction).

The opening 20*a* of the table base 20 has a rectangular shape in plan view of the suction table 2 as viewed from above. The table top 21 also has a rectangular shape in plan view. When the table top 21 is internally fitted into the opening 20*a*, an internal space 23 is formed between the table base 20 and the table top 21.

The upper surface of the table top 21 serves as a placement surface 21*a* for the medium M, and the placement surface 21*a* is provided with a plurality of suction holes 22 (through holes) over substantially the entire surface.

The internal space 23 of the suction table 2 communicates with the outside via the suction holes 22 provided in the table top 21.

A piping 51 of the suction force generating mechanism 5 is connected to the table base 20 of the suction table 2. The piping 51 is communicated to the internal space 23 of the suction table 2.

The piping 51 is provided with a blower 52 of the suction force generating mechanism 5. The blower 52 is driven by an inverter 53 controlled by the control device 55.

The output level of the blower 52 changes according to the output level of the inverter 53. When the inverter 53 is driven at the maximum output level, the blower 52 operates at the maximum output level, and the blown air volume of the blower 52 becomes a maximum. The output level of the blower 52 increases or decreases in conjunction with the increase or decrease of the output level of the inverter 53.

The blower 52 forms a flow of air from one side to the other side of the blower 52 by rotation of an impeller (not illustrated). The operation/stop of the blower 52 is controlled by the control device 55.

In the present embodiment, the blower 52 forms a flow of air from the internal space 23 of the suction table 2 toward the blower 52 in the piping 51, and generates a pressure state (negative pressure state) lower than the atmospheric pressure in the internal space 23.

In the piping 51, a pressure sensor 54 is provided in the vicinity of a communication opening with the internal space 23. An output signal of the pressure sensor 54 is input to the control device 55.

The control device 55 includes a pressure calculator 551, a suction force controller 552, a switcher 553, and a counter 554 as functional blocks.

The pressure calculator 551 calculates a pressure value Pin inside the internal space 23 from the output signal of the pressure sensor 54. In the present embodiment, the pressure value Pin of the internal space 23 is handled as an index indicating the suction force generated on the placement surface 21*a* of the suction table 2.

Therefore, the magnitude of the calculated pressure value Pin inside the internal space 23 means the magnitude of the suction force generated in the suction table 2.

The suction force controller 552 controls the output level of the inverter 53 to control the operation/stop of the blower 52 and the blown air volume of the blower 52.

The switcher 553 switches the output level of the inverter 53 to change the suction force generated in the suction table 2. Specifically, the output level of the inverter 53 is switched based on the pressure value Pin of the internal space 23 calculated by the pressure calculator 551.

The counter 554 counts an elapsed time from the start of operation of the blower 52.

Here, the blower 52 is not particularly limited as long as a flow of air can be formed in the piping 51. A fan having a compression ratio of less than or equal to 1.1, a blower having a compression ratio of about 1.1 to 2.0, or the like can be appropriately selected.

When the blower 52 is driven, the air in the internal space 23 is suctioned toward the blower 52 side and discharged to the outside from the outlet of the piping 51.

Then, a negative pressure is generated in the internal space 23 of the suction table 2, and air is drawn into the internal space 23 from the suction hole 22 opened in the placement surface 21*a* of the suction table 2.

Due to this flow of air, a suction force (negative pressure) is generated at the suction hole 22 in the placement surface 21*a* of the suction table 2.

The medium M placed on the suction table 2 is suctioned to the placement surface 21*a* of the suction table 2 by the suction force generated by the operation of the blower 52, and is held in a state where the movement in the horizontal direction (X direction, Y direction) is restricted.

In the inkjet printing apparatus 1, information such as an image or a character is printed on the medium M whose movement in the horizontal direction is restricted.

Here, the size of the suction table 2 is set according to the medium having the largest size to be printed by the inkjet printing apparatus 1.

Therefore, in a case of the medium M having an area smaller than the placement surface 21*a*, a part of the suction hole 22 opened in the placement surface 21*a* is not covered with the medium M and is in a released state.

When the blower 52 is driven to generate the suction force, more air flows into the internal space 23 from the region of the suction hole 22 not covered with the medium M.

Then, the negative pressure generated in the internal space 23 is reduced by the air flowing into the internal space 23 from the region of the suction hole 22 not covered with the medium M. In such a case, the suction force generated in the region of the suction hole 22 covered with the medium M is weakened, and the holding of the medium M on the placement surface 21*a* may be affected.

Therefore, in order to hold the medium M on the placement surface 21*a*, it is necessary to increase the negative pressure generated in the internal space 23 to strengthen the suction force generated in the region of the suction hole 22 not covered with the medium M.

However, when the negative pressure generated in the internal space 23 is increased, the flow speed of the air flowing into the internal space 23 through the suction hole 22 increases in the region of the suction hole 22 not covered with the medium M. Then, the sound generated when the air passes through the suction hole 22 increases with the increase in the negative pressure, and the noise level of the inkjet printing apparatus 1 increases.

Furthermore, when the negative pressure generated in the internal space 23 becomes large, the suction force generated in the region of the suction hole 22 becomes strong, and thus a pattern following the shape of the suction hole 22 occurs on the medium M depending on the thickness of the medium M.

In the present embodiment, the pressure value Pin of the internal space 23 is regarded as an index of the suction force generated by the suction table 2, and is used for the control of the blower 52 by the control device 55.

Specifically, the control device 55 optimizes the blown air volume of the blower 52 by adjusting the blown air volume of the blower 52 within a range not impairing the negative pressure (suction force) of the internal space 23.

When the blown air volume of the blower 52 is optimized and reduced, the force of air flowing into the internal space 23 is suppressed, so that the sound generated when the air passes through the suction hole 22 is suppressed, and the pattern following the shape of the suction hole 22 is suppressed from occurring on the medium M.

Hereinafter, an example of a process performed by the control device 55 of the inkjet printing apparatus 1 will be described.

Figure 4:
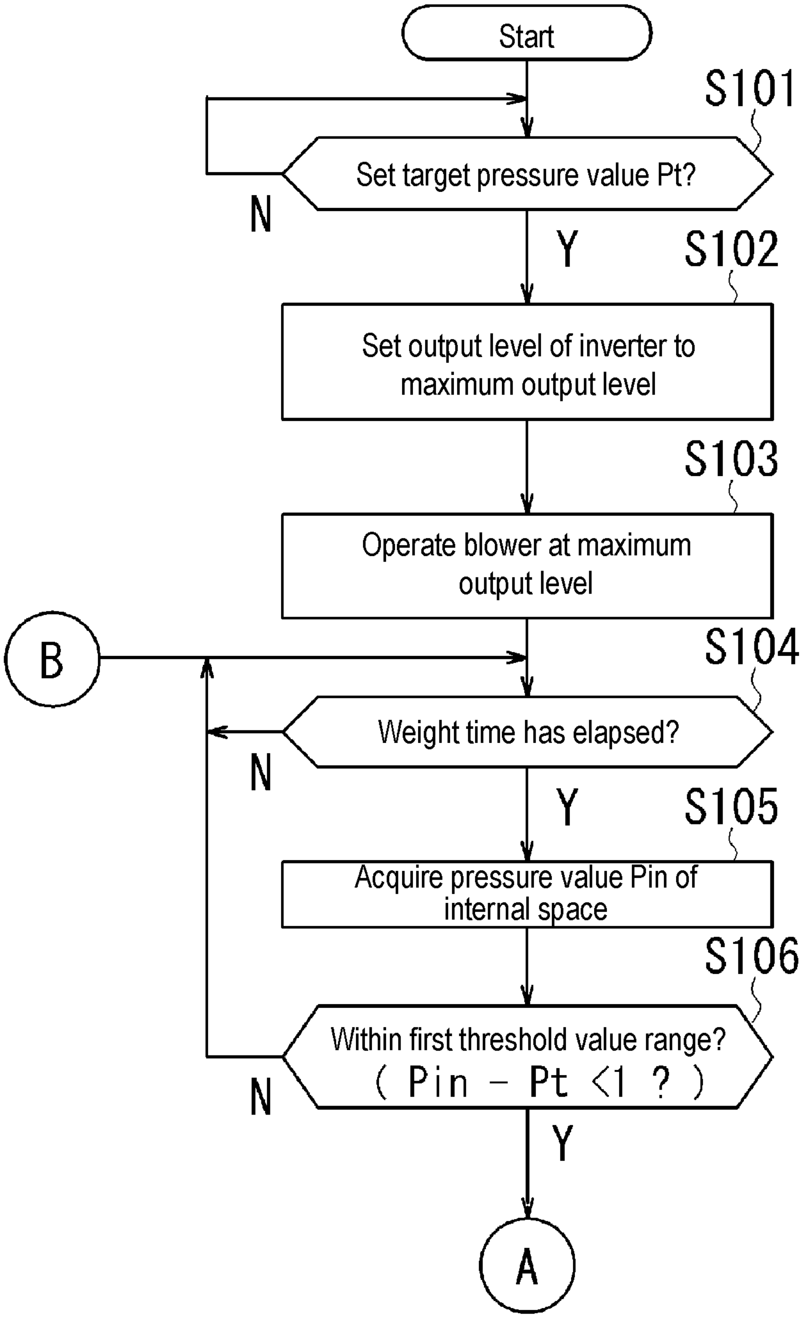
FIG. 4 is a flowchart of suction force adjusting process performed by a control device.
Figure 5:
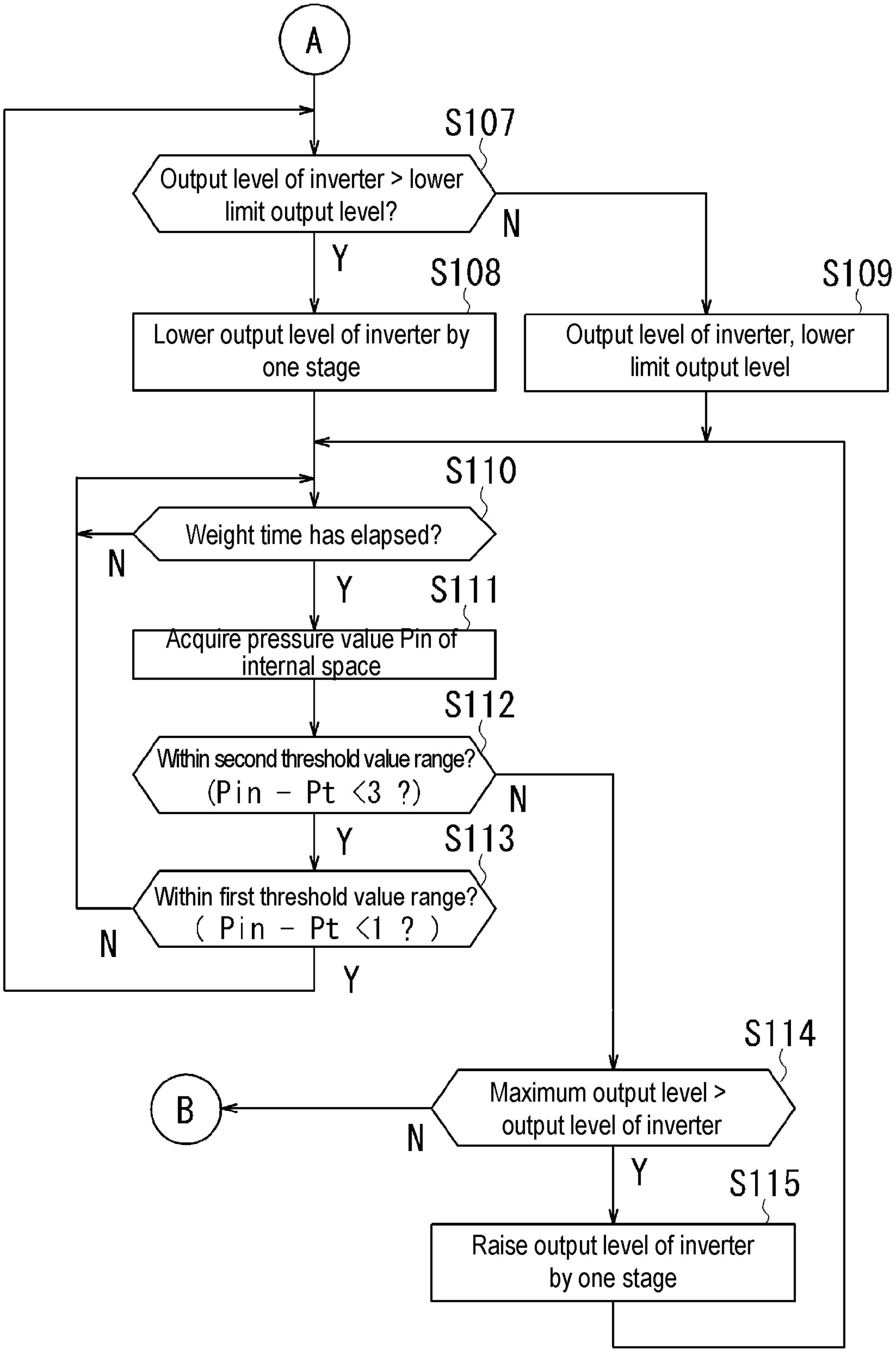
FIG. 5 is a flowchart of suction force adjusting process performed by the control device.

FIGS. 4 and 5 are flowcharts of suction force adjusting process performed by the control device 55.

In the inkjet printing apparatus 1, the pressure value Pin of the internal space 23 measured by the pressure sensor 54 is used as an index of the suction force generated on the suction table 2.

Thus, in the inkjet printing apparatus 1, the target value of the pressure in the internal space 23 is set when carrying out printing on the medium M.

A target pressure value Pt is a target value of the pressure of the internal space 23 that generates the target suction force (first suction force) on the suction table 2.

The target pressure value Pt may be manually and arbitrarily set by the user, or may be uniformly set to a predetermined value determined according to the size of the medium M.

When the target pressure value Pt is set (Step S101, Yes), the control device 55 (suction force controller 552) sets the output level of the inverter 53 to the maximum output level (step S102).

Note that the output level of the inverter 53 is not necessarily set to the maximum output level, and may be any output level as long as the pressure of the internal space 23 can be reduced toward the target pressure value Pt.

Here, when the settable range of the target pressure value Pt is −4 kPa to −13 kPa, the target pressure value Pt is set within this range.

In the present embodiment, the output level of the inverter 53 is divided into 21 stages from "0" to "20" by way of an example. For example, when the output level is set to "20", the blown air volume of the blower 52 is maximized, and when the output level is set to "0", the blowing by the blower 52 is stopped.

Therefore, as the output level of the inverter 53 increases, the output level of the blower 52 also increases, and the air quantity drawn from the internal space 23 toward the blower 52 increases, so that the pressure value Pin of the internal space 23 of the suction table 2 can be reduced. That is, the suction force to generate can be strengthened.

The control device 55 (suction force controller 552) operates the blower 52 by controlling the inverter 53 at the set output level (step S103).

When elapse of a preset weight time (e.g., one second) is confirmed by the counter 554 (step S104, Yes), the control device 55 (pressure calculator 551) acquires the pressure value Pin (suction force at current time point) of the internal space 23 from the output value of the pressure sensor 54 (step S105).

The control device 55 (switcher 553) confirms whether or not the pressure value Pin of the internal space 23 has reached within a first threshold value range and the decompression of the internal space 23 has been completed (step S106).

Specifically, when the condition of the following formula (1) is satisfied, determination is made that the decompression of the internal space 23 is completed.

$$Pin-Pt<1 \quad (1)$$

Here, Pin is the pressure value of the internal space 23 at the current time point, and Pt is the target pressure value of the internal space set in step S101.

When the stopped blower 52 is operated, the pressure value Pin of the internal space 23 reduces from the atmospheric pressure toward the target pressure value Pt.

For example, in a case where the target pressure value Pt is −5 kPa, when the pressure value Pin of the internal space 23 falls within the range of $-4\text{ kPa} < Pin \leq -5\text{ kPa}$, the condition of the above formula (1) is satisfied and determination is made that the decompression of the internal space 23 is completed (step S106, Yes).

The first threshold value range is a predetermined range on the side where the suction force based on the target pressure value Pt is weak (the pressure value Pin is low). In the present embodiment, when the target pressure value Pt is −5 kPa, the range of $-4\text{ kPa} < Pin \leq -5\text{ kPa}$ is set as the first threshold value range.

Therefore, until the pressure value Pin of the internal space 23 falls within the first threshold value range, the determination in step S106 is negative, and the processes from steps S104 to S106 are repeated.

Then, when the pressure value Pin of the internal space 23 reduced toward the target pressure value Pt falls within the first threshold value range (step S106, Yes), determination is made that the decompression of the internal space 23 is completed, and the process proceeds to step S107 (see FIG. 5).

The process after step S107 is the process for adjusting the output level of the inverter 53 to optimize the operation of the blower 52.

Specifically, it is the process of optimizing the operation of the blower 52 by suppressing the air blown air volume of the blower 52 while maintaining the pressure value Pin of the internal space 23 within the pressure range that can regulate the movement of the medium M.

In step S107, the control device 55 (switcher 553) confirms whether or not the output level of the inverter 53 is higher than the lower limit output level.

As an example, when the output level of the inverter 53 is divided into 21 stages from "0" to "20", the lower limit output level of the inverter 53 is the output level "2".

At this output level, the blown air volume of the blower 52 is the minimum air quantity at which the inside of the internal space 23 can be maintained in a negative pressure state.

The negative pressure state of the internal space 23 when the output level is "2" means the minimum pressure that can regulate the movement of the medium M on the suction table 2 and hold the medium M on the suction table 2.

The suction force generated on the suction table 2 at the minimum pressure that can hold the medium M on the suction table 2 corresponds to the lower limit suction force.

In the first step S107 after the process of step S106, the output level of the inverter 53 remains at the maximum output level set in step S102. Therefore, the determination in step S107 is positive (step S107, Yes), and the process proceeds to step S108.

Step S107 is provided to confirm whether the output level has reached the lower limit when the output level of the inverter 53 is reduced by the process to be described later.

In step S108, the control device 55 (switcher 553) lowers the output level of the inverter 53 by one stage. As a result, when the output level of the inverter 53 is "20", the output level of the inverter 53 is changed to "19".

When elapse of a preset weight time (e.g., one second) is confirmed by the counter 554 (step S110, Yes), the control device 55 (pressure calculator 551) acquires the pressure value Pin of the internal space 23 from the output value of the pressure sensor 54 (step S111).

The control device 55 (switcher 553) confirms whether or not the pressure value Pin of the internal space 23 is remained within a second threshold value range and the decompression level of the internal space 23 is within an allowable range (step S112).

Specifically, when the condition of the following formula (2) is satisfied, determination is made that the decompression level of the internal space 23 is within the allowable range.

$$Pin-Pt<3 \quad (2)$$

Here, Pin is the pressure value of the internal space 23 at the current time point, and Pt is the target pressure value set in step S101.

When the output level of the inverter 53 is lowered by one stage, the blown air volume of the blower 52 reduces, and as a result, the suction force becomes weak, and the pressure value Pin of the internal space 23 may move away from the target pressure value Pt.

For example, in a case where the target pressure value Pt is −5 kPa, when the pressure value Pin of the internal space 23 is within the range of $-2\text{ kPa}<Pin\leq-5\text{ kPa}$, the condition of the above formula (2) is satisfied and determination is made that the decompression level of the internal space 23 is within the allowable range (step S112, Yes).

The second threshold value range is a predetermined range in which the first threshold value range is enlarged toward the side the pressure value reduces (the suction force reduces) with the target pressure value Pt as a reference. For example, when the target pressure value Pt is −5 kPa, the range of $-2\text{ kPa}<Pin\leq-5\text{ kPa}$ is set as the second threshold value range.

When the pressure value Pin of the internal space 23 is within the second threshold value range (step S112, Yes), the influence on the decompression level of the internal space 23 by the reduction of the blown air volume of the blower 52 is within the allowable range that does not affect the holding of the medium M.

In such a case, in step S113, the control device 55 (switcher 553) confirms whether or not the pressure value Pin of the internal space 23 is within the first threshold value range and the output level of the inverter 53 can be further reduced (step S113).

Specifically, when the condition of the following formula (3) is satisfied, determination is made that the output level of the inverter 53 can be further reduced.

$$Pin-Pt\leq 1 \quad (3)$$

Here, Pin is the pressure value of the internal space 23 at the current time point, and Pt is the target pressure value set in step S101.

When the output level of the inverter 53 is lowered by one stage in step S108, the blown air volume of the blower 52 reduces, and the pressure value Pin of the internal space 23 of the suction table 2 may possibly reduce in a direction away from the target pressure value Pt (direction in which the suction force weakens).

However, even if the output level of the inverter 53 is lowered by one stage, there is room to further reduce the output level of the inverter 53 by one stage in a case where the requirement of the above formula (1) is satisfied.

In such a case, determination is made that the output level of the inverter 53 can be further reduced (step S113, Yes), and the process proceeds to step S107.

As a result, in step S108 to be newly performed, the output level of the inverter 53 is further lowered by one stage. For example, the output level of the inverter 53 is changed from "19" to "18".

When the pressure value Pin of the internal space 23 is within the second threshold value range (step S112, Yes) but outside the first threshold value range (step S113, No), the reduction in the blown air volume of the blower 52 is within the allowable range that does not affect the holding of the medium M, but the output level of the inverter 53 cannot be further lowered by one stage.

In this case, the processes from step S110 to step S113 are repeated, and the output level of the inverter 53 remains maintained.

When the pressure value Pin of the internal space 23 reaches within the first threshold value range (step S113, Yes) while the processes from step S110 to step S113 are repeated, the process proceeds to step S107.

In such a case, the pressure value Pin of the internal space 23 has reached the pressure value at which the output level of the inverter 53 can be further reduced, and hence the output level of the inverter 53 is further lowered by one stage in the new step S108 following step S107.

Then, while the conditions of the above formulas (2) and (3) are satisfied and the output level of the inverter 53 can be further reduced, the processes from step S107 to step S113 are repeated, and the output level of the inverter 53 is reduced in a step-wise manner one stage at a time.

Then, when the output level of the inverter 53 reaches the lower limit output level (step S107, No), the output level of the inverter 53 is thereafter maintained at the lower limit output level (step S109). As a result, the blown air volume of the blower 52 is held at a blown air volume at which the pressure value Pin of the internal space 23 can maintain the internal space 23 in the negative pressure state.

On the other hand, when the pressure value Pin of the internal space 23 deviates from the second threshold value range (step S112, No) after the output level of the inverter 53 is lowered by one stage, the control device 55 (switcher 553) confirms whether or not the output level of the inverter 53 at the current time point is less than the maximum output level (step S114).

This is because when the output level of the inverter 53 is the maximum output level, the pressure value Pin of the internal space 23 cannot be lowered by increasing the output level of the inverter 53 to increase the blown air volume of the blower 52.

On the other hand, when the output level of the inverter 53 at the current time point is less than the maximum output level (step 5114, Yes), the control device 55 (switcher 553) increases the output level of the inverter 53 by one stage (step S115).

The control device 55 (switcher 553) confirms whether or not the pressure value Pin of the internal space 23 after the output level of the inverter 53 is increased by one stage is within the second threshold value range (step S112).

When the pressure value Pin of the internal space 23 is outside the second threshold value range (step S112, No) even after the output level of the inverter 53 is increased by one stage, steps S110, S111, S112, S114, and S115 are repeated.

As a result, while the pressure value Pin of the internal space 23 is outside the second threshold value range, the output level of the inverter 53 is raised by one stage (steps S112, S114, and S115).

Then, when the output level of the inverter 53 is raised to the maximum output level (step S114, No), the output level cannot be raised any more, and thus the process proceeds to step S104 described above (see FIG. 4).

Furthermore, when the pressure value Pin of the internal space 23 falls within the second threshold value range while the output level of the inverter 53 is being raised by one stage (step S112, Yes), steps S110, S111, S112, and S113 are repeated until the pressure value Pin of the internal space 23 reaches within the first threshold value range (step S113, No).

For example, when the target pressure value Pt is −5 kPa, if the pressure value Pin of the internal space 23 is within the range of −2 kPa<Pin≤−5 kPa (within the second threshold value range), the output level of the inverter 53 is held without being changed.

When the pressure value Pin of the internal space 23 falls within the first threshold value range (step S113, Yes) while steps S110, S111, S112 and S113 are being repeated, the process proceeds to step S107.

In such a case, the pressure value Pin of the internal space 23 has reached the pressure value at which the output level of the inverter 53 can be further reduced, and hence the output level of the inverter 53 is further lowered by one stage in the new step S108 following step S107.

Then, while the conditions of the above formulas (2) and (3) are satisfied and the output level of the inverter 53 can be further reduced, the processes from step S107 to step S113 are repeated, and the output level of the inverter 53 is reduced in a step-wise manner one stage at a time.

As described above, the control device 55 (switcher 553) optimizes the air blown air volume of the blower 52 by increasing or decreasing the output level of the inverter 53 while holding the pressure value Pin of the internal space 23 within at least the second threshold value range.

That is, the control device 55 (switcher 553) lowers the output level of the blower 52 in a step-wise manner while maintaining the suction force. Thus, occurrence of a situation where the suction force becomes too weak while the output level of the blower 52 is being lowered and the medium M cannot be appropriately held on the suction table 2 can be suitably prevented.

Here, the second suction force in the invention is a suction force weaker than the first suction force, and is a suction force between the first suction force and the lower limit suction force (first suction force >second suction force >lower limit suction force).

In a case where the output level of the blower 52 is lowered in a step-wise manner, the second suction force changes according to the type and size of the medium M placed on the suction table 2, the machine body difference of the inkjet printing apparatus 1 and the blower 52, the usage environment, and the like.

In the present embodiment, a case has been exemplified where the control device 55 (switcher 553) switches from the first suction force to the second suction force based on the pressure value Pin of the internal space 23.

The timing of switching from the first suction force to the second suction force may be as follows.

(a) Time point when a predetermined time has elapsed from the start of driving of the blower 52 by the placement of the medium M on the placement surface 21*a*. In this case, the counter 554 included in the control device 55 counts the elapsed time from the start of driving of the blower 52.

(b) Time point when the operation mode of the inkjet printing apparatus 1 is switched from a placement mode of the medium M onto the placement surface 21*a* to a printing mode of performing printing on the placed medium M. That is, it may be until the printing operation on the medium M is started.

As described above, the inkjet printing apparatus 1 according to the present embodiment has the following configuration.

(1) An inkjet printing apparatus 1 (medium holding device) includes:

- a suction table 2 (table) having a placement surface 21*a* for the medium M;
- a blower 52 (suction force generator) that generates a suction force on the placement surface 21*a*; and
- a control device 55 (controller) that controls a suction force generated by the blower 52.

The control device 55 includes a switcher 553 that switches the suction force to be generated.

When the medium M is placed on the placement surface 21*a*, the switcher 553 drives the blower 52 at the first output level to generate the first suction force, and suctions the medium M placed on the placement surface 21*a*. Thereafter, the blower 52 is driven at the second output level lower than the first output level to generate the second suction force weaker than the first suction force, thereby suctioning the medium M placed on the placement surface 21*a*.

According to such a configuration, the suction force can be optimized while maintaining the suction force with which the medium M can be held on the suction table 2.

The inkjet printing apparatus 1 according to the present embodiment has the following configuration.

(2) The control device 55 (switcher 553) switches from the first suction force to the second suction force according to (a) the suction time of the medium M with the first suction force, (b) the actual suction force (pressure value Pin of the internal space 23 of the suction table 2) realized by the suction of the medium M with the first suction force, or (c) the processing mode of the processor (operation mode of the inkjet printing apparatus 1) that processes the medium M placed on the placement surface 21*a*.

According to such a configuration, the suction force can be optimized at an appropriate timing while maintaining the suction force with which the medium M can be held on the suction table 2.

The inkjet printing apparatus 1 according to the present embodiment has the following configuration.

(3) The control device 55 includes:

- a pressure sensor 54 (suction force detector) that detects an actual suction force realized by the suction of the medium M with the first suction force.

The switcher 553 switches from the first suction force to the second suction force when the change amount of the actual suction force detected by the pressure sensor 54 converges and the actual suction force stabilizes.

According to such a configuration, the suction force can be optimized at an appropriate timing while maintaining the suction force with which the medium M can be held on the suction table 2.

The inkjet printing apparatus 1 according to the present embodiment has the following configuration.

(4) The control device 55 includes a counter 554.

The switcher 553 switches the suction force to the second suction force when the elapsed time from the start of suction of the medium M with the first suction force reaches a specified time defined in advance by the counter 554.

The specified time is a time from the start of suction of the medium M with the first suction force until the change amount of the actual suction force realized by the suction of the medium M with the first suction force converges.

According to such a configuration, the suction force can be optimized at an appropriate timing while maintaining the suction force with which the medium M can be held on the suction table 2.

The inkjet printing apparatus 1 according to the present embodiment has the following configuration.

(5) The control device 55 (switcher 553) reduces, in a step-wise manner, the output level of the blower 52 when switching the suction force from the first suction force to the second suction force, to weaken the suction force in a step-wise manner.

The control device 55 (switcher 553):

confirms a pressure value Pin (actual suction force) of the internal space 23, which is an index of the suction force, every time the output level of the blower 52 is reduced to weaken the suction force, and when confirmed that the confirmed pressure value Pin is within the first threshold value range based on the target pressure value Pt (target suction force), further lowers the output level of the blower 52 to weaken the suction force.

According to such a configuration, the output level of the blower 52 can be lowered in a step-wise manner while maintaining the suction force with which the medium M can be held on the suction table 2. Thus, occurrence of a situation where the suction force becomes too weak while the output level of the blower 52 is being lowered and the medium M cannot be appropriately held on the suction table 2 can be suitably prevented.

The inkjet printing apparatus 1 according to the present embodiment has the following configuration.

(6) The control device 55 (switcher 553) confirms the pressure value Pin (actual suction force) of the internal space 23, which is an index of the suction force, and when the confirmed actual suction force has reached the lower limit suction force, does not change the output level of the blower 52 even if it is confirmed that the confirmed pressure value Pin is within the first threshold value range.

When the output level of the blower 52 is lowered below the lower limit output level, it may become difficult to maintain the suction force. Therefore, with the above configuration, the output level can be reduced with the lower limit suction force as the limit when the output level of the blower 52 is reduced in a step-wise manner. Thus, occurrence of a situation where the suction force becomes weaker than the lower limit suction force and the medium M cannot be appropriately held on the suction table 2 can be suitably prevented.

The inkjet printing apparatus 1 according to the present embodiment has the following configuration.

(7) The control device 55 (switcher 553), increases the output level of the blower 52 to strengthen the suction force when confirmed that the confirmed pressure value Pin is outside the second threshold value range in which the first threshold value range is enlarged toward the side the suction force becomes weak.

According to such a configuration, when the suction force generated on the suction table 2 is weakened and the pressure value Pin is deviated to the side the suction force becomes weaker than the second threshold value range, the weakened suction force can be quickly returned to the original suction force.

The inkjet printing apparatus 1 according to the present embodiment has the following configuration.

(8) After lowering the output level of the blower 52 to weaken the suction force, the control device 55 (switcher 553) maintains the output level of the blower 52 without changing while the confirmed pressure value Pin is within the second threshold value range and outside the first threshold value range to maintain the suction force without changing.

According to such a configuration, the medium M can be appropriately held by maintaining the output level of the blower 52 without changing while the support of the medium M is not impaired even if the suction force is weakened.

The inkjet printing apparatus 1 according to the present embodiment has the following configuration.

(9) The control device 55 (switcher 553) lowers the output level of the blower 52 to a minimum output level at which the pressure value Pin can be held within the first threshold value range up until the printing operation on the medium M placed on the placement surface 21*a* is started.

According to such a configuration, the printing operation on the medium M can be performed while reliably holding the medium M on the placement surface 21*a*. If the holding of the medium M is insufficient, wrinkles and floating may occur on the surface of the medium M, in which case, printing at a portion where wrinkles and floating occurred may be hindered, but the occurrence of such a situation can be suitably prevented.

Modified Example

In the embodiment described above, a case has been exemplified in which the blower 52 is driven at the maximum output level to cause the pressure value Pin of the internal space 23, which is an index of the suction force, to reach the pressure value Pin within the first threshold value range based on the target pressure value Pt, and then output level of the inverter 53 that drives the blower 52 is lowered in a step-wise manner while maintaining the pressure value Pin in the internal space 23.

Adjustment of the output level of the blower 52 is not limited only to this aspect.

For example, in the process of driving the blower 52 at the maximum output level to strengthen the suction force, the output level of the blower 52 may be reduced to the minimum output level at which the pressure value Pin in the internal space 23 can be held within the first threshold value range after the change rate per unit time of the pressure value Pin becomes less than the change rate of the threshold value.

Figure 6:
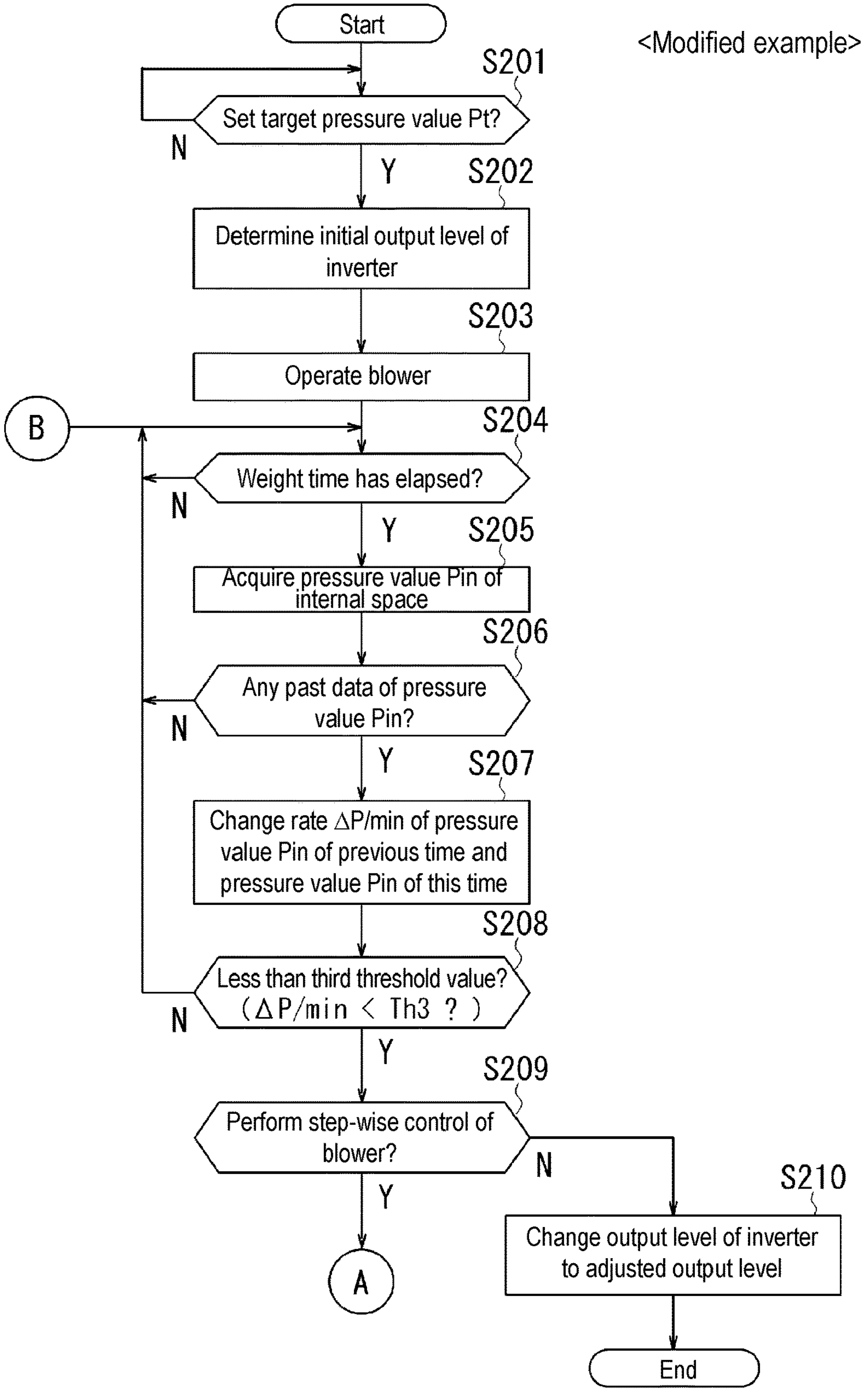
FIG. 6 is a flowchart of suction force adjusting process according to a modified example.

FIG. 6 is a flowchart of suction force adjusting process according to a modified example.

Figure 7:
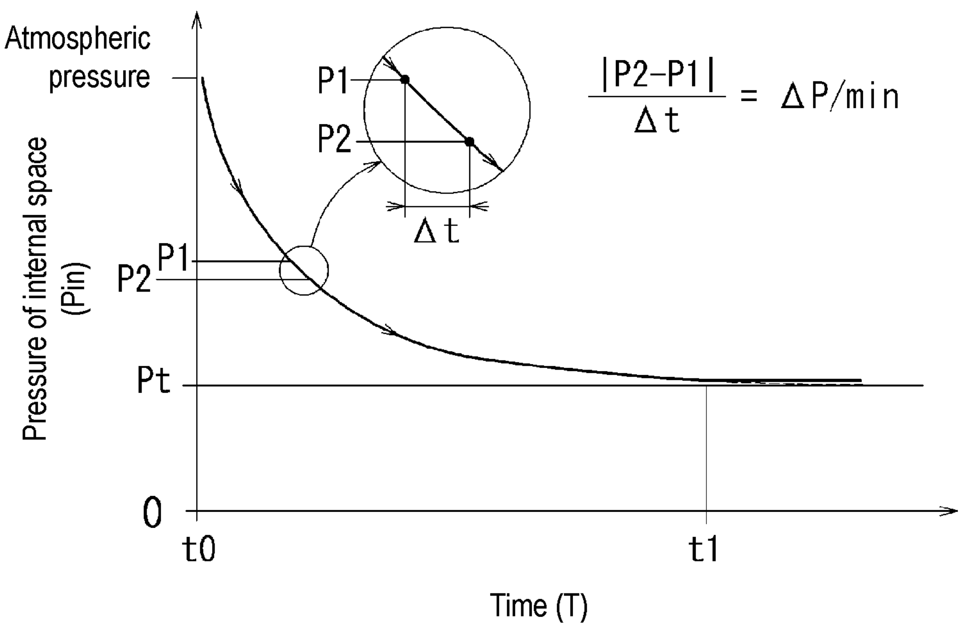
FIG. 7 is a time chart of when the suction force adjusting process according to a modified example is being performed.
Figure 7:
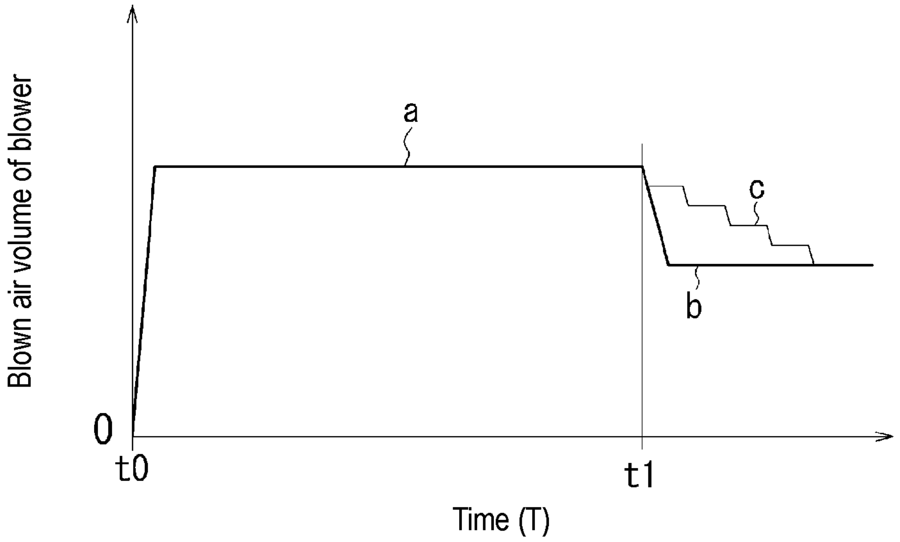

(a) of FIG. 7 is a time chart for explaining a change in the pressure value Pin (suction force) in the internal space 23 when the suction force adjusting process according to the modified example is performed.

(b) of FIG. 7 is a time chart for explaining a change in the air quantity of the blower 52 when the suction force adjusting process according to the modified example is performed.

In the suction force adjusting process according to the modified example, when the target value for realizing the target suction force, that is, the target value (target pressure value Pt) of the pressure value Pi of the internal space 23 is set in the suction table 2 (step S201, Yes), the control device 55 (suction force controller 552) determines the initial output level of the output level of the inverter 53 (step S202).

The initial output level is a fixed value determined according to the target pressure value Pt, the size of the medium M, and the like. It is a value determined through experiments and simulations. The initial output level may be set as the maximum output level.

The control device 55 (suction force controller 552) operates the blower 52 by controlling the inverter 53 at the set output level (step S203).

When elapse of a preset weight time (e.g., one second) is confirmed by the counter 554 (step S204, Yes), the control device 55 (pressure calculator 551) acquires the pressure value Pin (suction force at current time point) of the internal space 23 from the output value of the pressure sensor 54 (step S205).

The control device 55 (switcher 553) confirms the presence or absence of data (past data) of the pressure value Pin of the internal space 23 that has already been measured (step S206).

Since there is no past data immediately after the operation of the stopped blower 52 (step S206, No), the process proceeds to step S204 in such a case.

As illustrated in (a) of FIG. 7, if there is past data of the pressure value Pin, the control device 55 (switcher 553) calculates a change rate AP/min per unit time At from a difference between the pressure value Pin (P1) of the internal space 23 measured the previous time and the pressure value Pin (P2) of the internal space 23 measured this time (step S207).

Then, whether or not the calculated change rate AP/min is smaller than a third threshold value Th3 is confirmed (step S208).

When the stopped blower 52 is operated, the pressure value Pin of the internal space 23 reduces from the atmospheric pressure toward the target pressure value Pt (see (a) of FIG. 7). Although the change rate AP/min of the pressure value Pin is large immediately after the start of the operation of the blower 52 (time tO), when the elapsed time from the start of the operation becomes long, the change rate AP/min becomes small, and the pressure value Pin becomes difficult to decrease.

That is, the suction force on the suction table 2 stabilizes as a result of the change rate ΔP/min of the pressure value Pin in the internal space 23 converging and the pressure value stabilizing.

In the modified example, determination is made that the decompression of the internal space 23 is completed (step S208, Yes) at a time point the change rate AP/min of the pressure value Pin in the internal space 23 becomes less than the third threshold value Th3.

When the stepwise control of the blower 52 is not performed (step S209, No), the control device 55 (switcher 553) changes the output level of the inverter 53 to the adjusted output level.

Specifically, the adjusted output level is the output level at which the blown air volume of the blower 52 can be suppressed while maintaining the pressure value Pin of the internal space 23 within the pressure range that can regulate the movement of the medium M. The adjusted output level is a value determined in advance through experiments and simulations.

For example, as illustrated in (b) of FIG. 7, when the blower 52 is driven at time tO, the air blown air volume of the blower 52 increases to the blown air volume determined according to the initial output level and then is maintained at a constant blown air volume, as indicated by a solid line a in the figure.

When determined that decompression of the internal space 23 is completed at time tl, the blown air volume of the blower 52 is decreased to the blown air volume determined according to the adjusted output level, and then is maintained at the decreased blown air volume, as indicated by a solid line b in the figure.

Since the blown air volume determined according to the adjusted output level is a blown air volume that can hold the pressure value Pin of the internal space 23 within a pressure range that can regulate the movement of the medium M, the movement of the medium M placed on the suction table 2 can be reliably regulated.

When the stepwise control of the blower 52 is performed (step S209, Yes), the process proceeds to step S107 of the embodiment described above (see FIG. 5).

As a result, as indicated by a solid line c in the figure, the blown air volume of the blower 52 is reduced in a step-wise manner in a state where the pressure value Pin of the internal space 23 is held in a pressure range that can regulate the movement of the medium M.

The movement of the medium M placed on the suction table 2 can be reliably regulated in both a case where the stepwise control of the blower is performed and a case where the stepwise control of the blower is not performed.

As a result, in the inkjet printing apparatus 1, when printing is performed on the medium M placed on the suction table 2, wrinkles and floating of the medium M can be reliably prevented, so that improvement in printing accuracy can be expected.

As described above, the inkjet printing apparatus 1 according to the modified example has the following configuration.

(10) The control device 55 (switcher 553), lowers the output level of the blower 52 to a minimum output level (adjusted output level) at which the suction force that can hold the medium M on the suction table 2 can be held after a change rate ΔP/min of the suction force per unit time becomes less than a third threshold value Th3 (change rate of the threshold value) in a process of strengthening the suction force by driving the blower 52 (suction force generator) at the set initial output level.

According to such a configuration, the output level of the blower 52 can be appropriately adjusted since the blown air volume of the blower 52 can be adjusted while maintaining the suction force generated on the suction table 2.

In the lowering of the output level of the blower 52 to the adjusted output level, the output level may be lowered to the adjusted output level when the change rate AP/min of the suction force per unit time becomes less than the third threshold value Th3 (change rate of the threshold value), or may be lowered to the adjusted output level in a step-wise manner.

The inkjet printing apparatus 1 according to the modified example has the following configuration.

(11) The control device 55 (switcher 553) lowers the output level of the blower 52 to a minimum output level at which the suction force can be held up until the printing operation on the medium M placed on the placement surface 21*a* is started.

According to such a configuration, the printing operation on the medium M can be performed while reliably holding the medium M on the placement surface 21*a*. If the holding of the medium M is insufficient, wrinkles and floating may occur on the surface of the medium M, in which case, printing at a portion where wrinkles and floating occurred may be hindered, but the occurrence of such a situation can be suitably prevented.

In the embodiment and the modified example described above, the case where the suction force generator is the blower 52 has been exemplified. The suction force generator according to the present invention is not limited only to the blower 52 as long as it can generate suction force on the placement surface 21*a* of the suction table 2.

For example, a compressor may be employed instead of the blower 52.

In the embodiment and the modified example described above, the case where the inverter 53 controls the rotation speed of the impeller of the blower 52 to control the air quantity of the blower 52 has been described. Instead of the inverter 53, an AC motor capable of controlling the rotation speed of the impeller, for example, a stepping motor may be adopted, and the air quantity of the blower 52 may be controlled by the pulse control of the stepping motor.

In the embodiment and the modified example described above, the case where the medium holding device according to the present invention is the suction table 2 of the inkjet printing apparatus 1 has been exemplified. The medium holding device according to the present invention is not limited only to this aspect.

The medium holding device according to the present invention may be, for example, a suction table used in a cutting device that cuts a medium wound in a roll shape at a predetermined length.

In this case, the output level of the blower 52 is lowered to a minimum output level at which the suction force can be held up until the cutting operation on the medium M placed on the placement surface 21*a* is started.

As a result, the medium M can be cut while reliably holding the medium M on the placement surface 21*a*, so that the cutting accuracy of the medium M is improved.

Although the embodiments of the present invention have been described above, the present invention is not limited only to the aspects described in these embodiments. Modifications can be made as appropriate within the scope of the technical idea of the invention.

The invention claimed is:

1. A medium holding device comprising:

a table having a placement surface for a medium;

a suction force generator that generates a suction force through a through hole formed in the placement surface; and a controller that controls the suction force generated by the suction force generator; wherein the controller includes a switcher that generates, when the medium is placed on the placement surface, a first suction force on the placement surface by the suction force generator to suction the medium, and thereafter, switches the suction force to a second suction force weaker than the first suction force to suction the medium, wherein the medium is processed by a processor in a state of being suctioned by the second suction force without changing position from a position where the medium is suctioned by the first suction force on the table, wherein the controller is configured to, when a switch from the first suction force to the second suction force is performed, weaken the suction force in a step-wise manner, and confirm the actual suction force, and when confirmed that the confirmed actual suction force is within a first threshold value range having a target suction force as a reference, further weaken the suction force.

2. A medium holding device comprising:

a table having a placement surface for a medium;

a suction force generator that generates a suction force through a through hole formed in the placement surface; and a controller that controls the suction force generated by the suction force generator; wherein the controller includes a switcher that generates, when the medium is placed on the placement surface, a first suction force on the placement surface by the suction force generator to suction the medium, and thereafter, switches the suction force to a second suction force weaker than the first suction force to suction the medium, wherein the switcher switches from the first suction force to the second suction force according to an actual suction force realized by suction of the medium with the first suction force, wherein the controller is configured to, when a switch from the first suction force to the second suction force is performed, weaken the suction force in a step-wise manner, and confirm the actual suction force, and when confirmed that the confirmed actual suction force is within a first threshold value range having a target suction force as a reference, further weaken the suction force.

3. The medium holding device as set forth in claim 2, wherein the controller further includes a suction force detector that detects an actual suction force realized by suction of the medium with the first suction force, and detects a change amount of the actual suction force; and the switcher switches from the first suction force to the second suction force when the change amount of the actual suction force converges and the actual suction force stabilizes.

4. The medium holding device as set forth in claim 2, wherein the controller further includes a counter, and the switcher switches the suction force to the second suction force when an elapsed time from a start of suction of the medium with the first suction force reaches a specified time defined in advance by the counter, and the specified time is a time from the start of suction of the medium with the first suction force until a change amount of the actual suction force converges.

5. The medium holding device as set forth in claim 2, wherein the controller is configured not to weaken the suction force even if the confirmed actual suction force is confirmed to be within the first threshold value range when the confirmed actual suction force has reached a lower limit suction force.

6. The medium holding device as set forth in claim 5, wherein the controller is configured to strengthen the suction force when the confirmed actual suction force is confirmed to be outside a second threshold value range in which the first threshold value range is enlarged toward a side the suction force becomes weaker.

7. The medium holding device as set forth in claim 6, wherein the controller is configured to, after weakening the suction force, maintain the suction force without changing while the confirmed actual suction force is within the second threshold value range and outside the first threshold value range.

8. The medium holding device as set forth in claim 2, wherein the controller is configured to strengthen the suction force when the confirmed actual suction force is confirmed to be outside a second threshold value range in which the first threshold value range is enlarged toward a side the suction force becomes weaker.

9. The medium holding device as set forth in claim 8, wherein the controller is configured to, after weakening the suction force, maintain the suction force without changing while the confirmed actual suction force is within the second threshold value range and outside the first threshold value range.

10. An inkjet printing apparatus comprising:

a table having a placement surface for a medium;

a suction force generator that generates a suction force through a through hole formed in the placement surface; and a controller that controls the suction force generated by the suction force generator; wherein the controller includes a switcher that generates, when the medium is placed on the placement surface, a first suction force on the placement surface by the suction force generator to suction the medium, and thereafter, switches the suction force to a second suction force weaker than the first suction force to suction the medium, wherein the switcher switches from the first suction force to the second suction force according to:

a suction time of the medium with the first suction force, an actual suction force realized by suction of the medium with the first suction force, or processing mode of a processor that processes the medium placed on the placement surface, wherein the controller is configured to, when a switch from the first suction force to the second suction force is performed, weaken the suction force in a step-wise manner, and confirm the actual suction force, and when confirmed that the confirmed actual suction force is within a first threshold value range having a target suction force as a reference, further weaken the suction force.

11. The inkjet printing apparatus as set forth in claim 10, wherein the medium is processed by a processor in a state of being suctioned by the second suction force without changing position from a position where the medium is suctioned by the first suction force on the table.

12. The inkjet printing apparatus as set forth in claim 10, wherein the controller is configured not to weaken the suction force even if the confirmed actual suction force is confirmed to be within the first threshold value range when the confirmed actual suction force has reached a lower limit suction force.

13. The inkjet printing apparatus as set forth in claim 12, wherein the controller is configured to strengthen the suction force when the confirmed actual suction force is confirmed to be outside a second threshold value range in which the first threshold value range is enlarged toward a side the suction force becomes weaker.

14. The inkjet printing apparatus as set forth in claim 13, wherein the controller is configured to, after weakening the suction force, maintain the suction force without changing while the confirmed actual suction force is within the second threshold value range and outside the first threshold value range.

15. The inkjet printing apparatus as set forth in claim 10, wherein the controller is configured to strengthen the suction force when the confirmed actual suction force is confirmed to be outside a second threshold value range in which the first threshold value range is enlarged toward a side the suction force becomes weaker.

16. The inkjet printing apparatus as set forth in claim 15, wherein the controller is configured to, after weakening the suction force, maintain the suction force without changing while the confirmed actual suction force is within the second threshold value range and outside the first threshold value range.

* * * * *